United States Patent [19]
Roth et al.

[11] Patent Number: 5,235,133
[45] Date of Patent: Aug. 10, 1993

[54] HOUSING

[75] Inventors: Timothy J. Roth; Frederick E. Roth, both of Oklahoma City, Okla.

[73] Assignee: Environmental Enclosures International, Tulsa, Okla.

[21] Appl. No.: 580,315

[22] Filed: Sep. 10, 1990

[51] Int. Cl.[5] .............................................. H02G 9/00
[52] U.S. Cl. ..................................... 174/37; 174/38; 174/50; 361/622; 52/20
[58] Field of Search ............... 174/37, 38, 50, 45 R, 174/52.1; 361/331, 334, 363, 365, 99, 352; 52/23, 79.1, 169.5, 169.6, 221, 173 R, 20, 169.14, 249

[56] References Cited

U.S. PATENT DOCUMENTS

| | | | |
|---|---|---|---|
| 1,617,626 | 2/1927 | Fitz Gerald . | |
| 2,724,968 | 11/1955 | Greene . | |
| 3,513,248 | 5/1970 | Bright et al. | 174/52.1 |
| 3,726,054 | 4/1973 | Anderson et al. | 52/23 |
| 3,858,371 | 1/1975 | Averill | 52/169.5 X |
| 4,156,998 | 6/1979 | McClure | 174/50 X |
| 4,709,120 | 11/1987 | Pearson | 174/37 X |

FOREIGN PATENT DOCUMENTS 2242131  3/1973  Fed. Rep. of Germany .......... 52/79

Primary Examiner—Leo P. Picard
Assistant Examiner—Hyung S. Sough
Attorney, Agent, or Firm—Gunn & Kuffner

[57] ABSTRACT

The present disclosure sets forth a telephonic equipment facility for field installation of equipment connected to telephone cables. It comprises a partially buried cabinet or container constructed of multi layered materials, defining a bottom having a sloping floor for draining water to a trough, upstanding sidewalls and a top or roof. In addition, above the bottom and protruding from one of the sidewalls, there is an extending cowling sized to define a door opening which is positioned above the support ground. At the opposite end of the structure, there is an appended cabinet portion having internally located frame members for support of cables extending through openings into the housing so that conductor pairs can be serviced. Equipment is placed in the interior supported on bottom mounted runners and upstanding frame members.

31 Claims, 3 Drawing Sheets

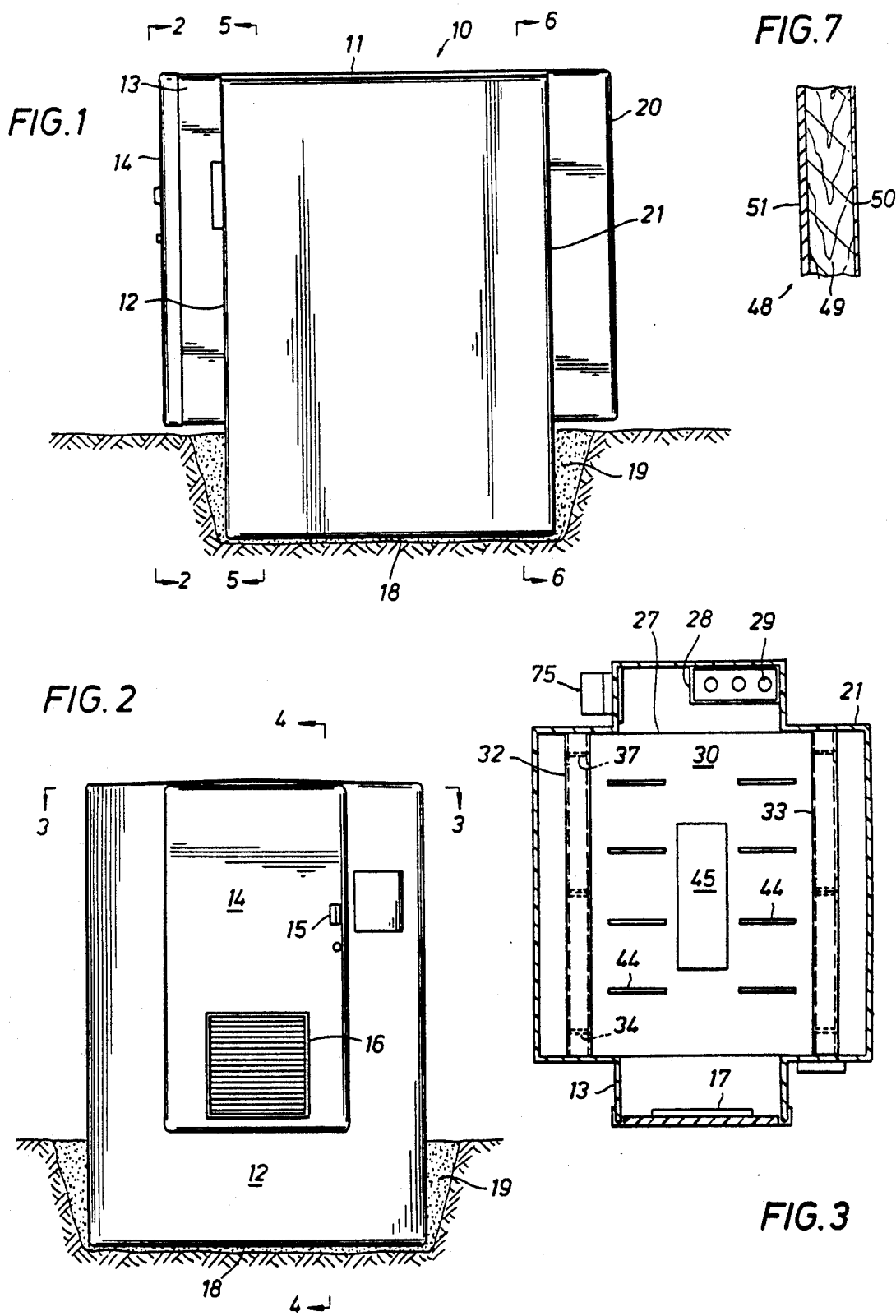

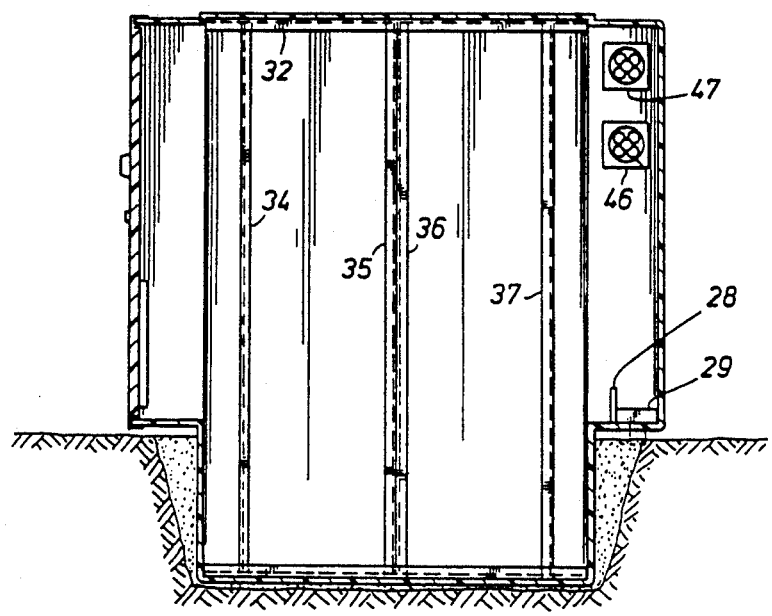
FIG. 4
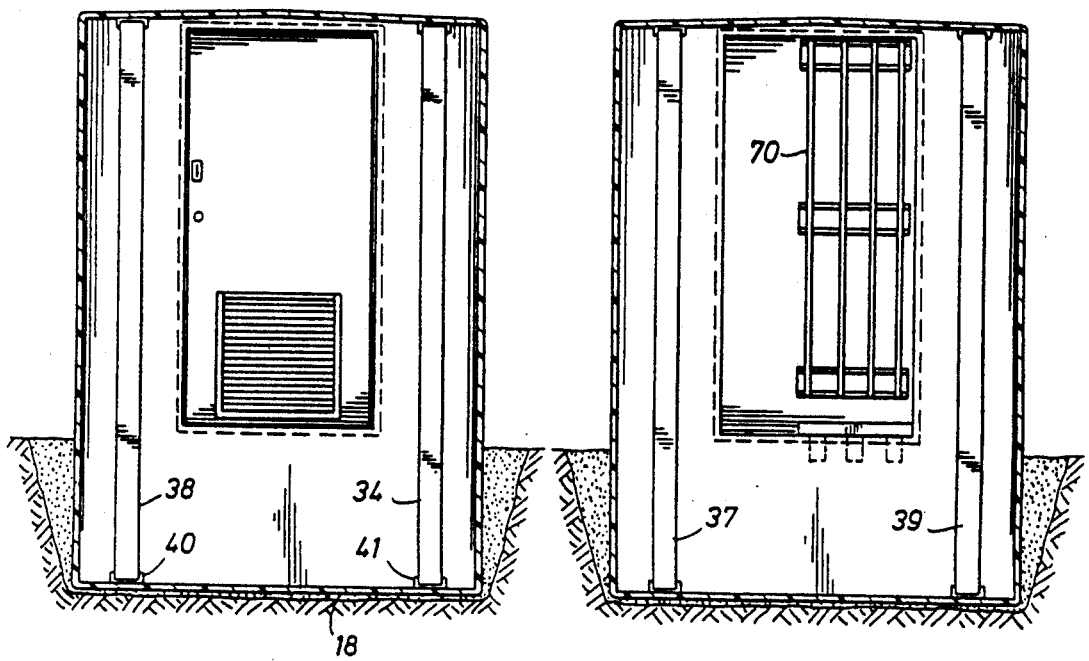
FIG. 5
FIG. 6

FIG.8
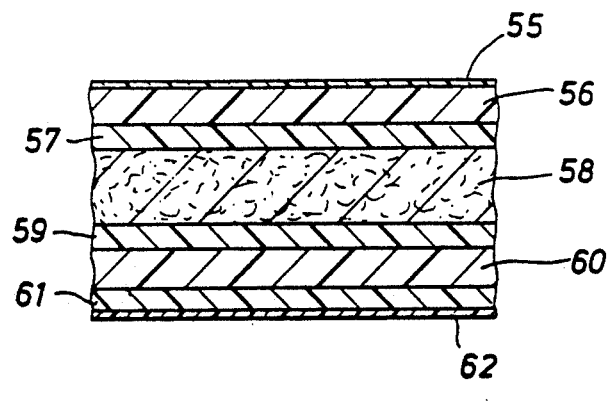
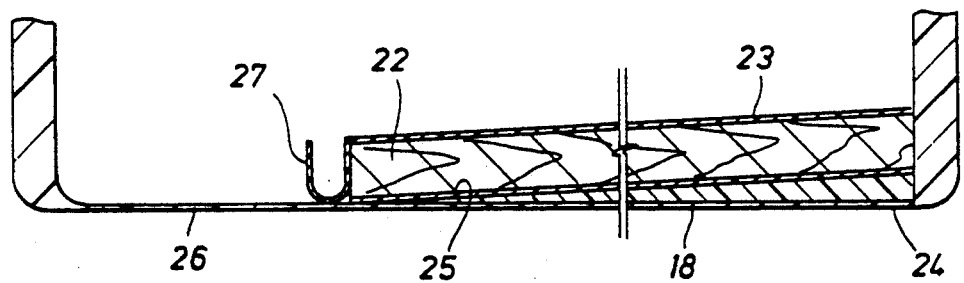
FIG.9
FIG.10
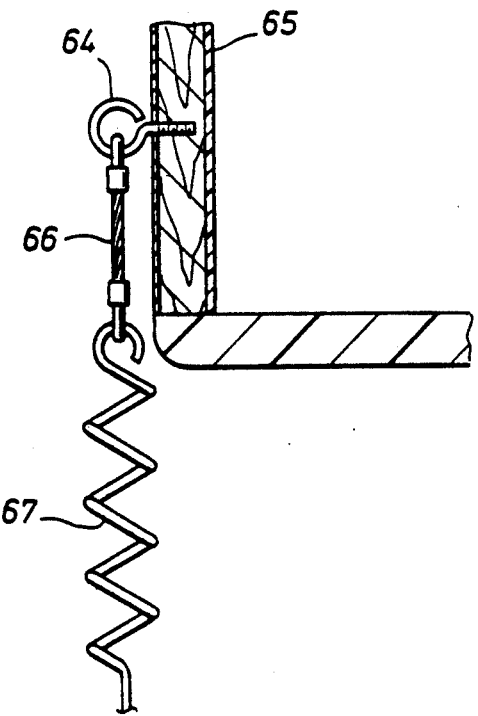

HOUSING

BACKGROUND OF THE INVENTION

This disclosure is directed to a recessed or buried equipment housing or container which is suitable for storing unmanned equipment such as telephone switch gear and the like within the secured housing. The present invention is therefore directed to a buried, or at least partially buried, housing having a door which opens to permit equipment installation and service. The present disclosure is therefore directed to a structure which is waterproof and weather tight and is therefore able to withstand the rigors of foul weather at any place of installation. It is normally intended to be installed in a remote location and left without human attendance. Personnel may service the equipment occasionally within. The present structure is the external housing of indefinite life for the purpose of protecting the enclosed equipment.

This structure is constructed somewhat differently from that structure for larger containers and which is described in U.S. Pat. No. 4,776,138. This structure is a relatively small structure. It is constructed with a multi-ply wall as will be detailed. Moreover, it is constructed with materials which provide strength and water resistance. Thus, intrusion by water is not possible. Many details of the device will become more apparent on a consideration of the presently disclosed structure.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a side view of the enclosure of the present disclosure installed by partially burying the structure wherein a portion is still located above ground;

FIG. 2 is a view along the line 2—2 of FIG. 1 showing the door and the appearance of the structure from the front;

FIG. 3 is a sectional view along the line 3—3 of FIG. 2 of the drawings which views the floor thereof and which shows equipment supports and pedestals for supporting the equipment within the structure;

FIG. 4 is a sectional view along the line 4—4 of FIG. 2 showing internal details of construction including wall braces which support the lengthwise walls of the structure and which additionally shows a ventilation system;

FIG. 5 is a sectional view along the line 5—5 of FIG. 1 showing the frame work adjacent to the door and the door frame;

FIG. 6 is a sectional view along the line 6—6 of FIG. 1 showing the back wall and includes details of construction of electrical service or conductors extending into the structure;

FIG. 7 is an enlarged sectional view through a portion of the wall showing details of construction;

FIG. 8 is a sectional view through portions of the cabinet showing additional details of construction;

FIG. 9 is a sectional view through the floor to show sloping construction for drainage; and FIG. 10 is a sectional view showing details of construction of an anchor system for anchoring the present invention in a particular location.

DETAILED DESCRIPTION OF THE PREFERRED EMBODIMENT

In FIG. 1 of the drawings, the numeral 10 refers to the closed container or housing for equipment which is to be installed and left at a particular location indefinitely. The external profile will be described first, and two embodiments thereof will be mentioned. The two embodiments differ only in slight details depending on the access to the cables or conductors cooperative with the equipment stored within the housing 10. The housing 10 is a closed structure having a roof 11 and a front wall 12. The front wall has a protruding or extending rectangular cowling 13 which supports a door 14 in an extended position. The door is sufficiently tall for human entry for service purposes. The front wall 12 is taller, typically about eight feet tall, the preferred height being about seven feet, nine inches. The front wall 12 thus stands seven feet, nine inches and has a width of about five feet. The typical depth of the structure is about six feet, six inches. This interior is sufficient to hold remotely installed equipment as will be detailed.

The front door 14 is provided with a door lock 15 and opens along one side by means of a hinge (not shown) which permits the door 14 to swing open. The door is provided with a louvered opening 16 which is protected against splash or rain by a set of downwardly sloping louvers. The port or opening 16 opens directly into an air filter 17 shown in FIG. 3 of the drawings. Air is permitted to flow into the housing 10 to provide ventilation for reasons to be described.

Continuing with the description, there is a bottom 18 shown in FIG. 1 which is of sufficient strength and ruggedness to enable the device to be supported in a partially buried position. It is partially buried in the sense that a hole is dug and the device is buried in a shallow fashion where the door is still exposed for surface entry. This provides lateral stability and resists tipping of the structure in contrast with its lack of stability should it otherwise be merely supported on the ground. To this end, a hole is shown in the drawings, the hole being dug to a depth of about two or three feet. The hole is partially filled with grout or compacted backfill at 19 so that the housing 10 is held in a stable fashion. There are two versions of the present apparatus which can be detailed quite simply referring to FIG. 1 of the drawings. FIG. 1 illustrates a first version which is adapted for installation with over ground wiring. Recall that the present apparatus is intended for use with equipment with telephone lines and the like. Often, the telephone lines are directed to the housing 10 via overhead poles and to this end, the numeral 20 identifies an inlet cabinet which is appended to the back wall 21. More specifically, the back wall 21 (see FIG. 3) supports the appended inlet cabinet which is approximately ten inches in depth and approximately three feet in width. The cabinet 20 is shown in FIG. 1 of the drawings to have a shortened height so that it terminates above the ground. This might be used in the instance where the cables are deployed to enter the cabinet 20 at the top end, for instance where the inlet cables drop from above to the housing 10 and connect at the inlet cabinet at the upper end. However, an alternate version can be used namely, where the cabinet 20 is as tall as the entire structure. In that instance, the cabinet 20 will extend below ground and is approximately even with the bottom 18 of the apparatus. This typically is used where the housing is connected with underground cabling and the cables must extend underground for connection at the lower end of the inlet cabinet 20. In either version, the cabinet is appended at the illustrated end so that inlet cables can be input and deployed for connection with various and sundry equipment which will be described by means of an example.

Assume that the cabinet 20 does extend full height, and that the bottom end thereof is an extension of the bottom 18 shown in FIG. 1. The floor across the bottom is made sloping as shown in FIG. 9. There, the sloping bottom 18 is shown. Certain details of construction should be noted. There is a portion 22 which is a sheet of balsa wood in the preferred embodiment. It is covered with an exposed layer 23 of woven fiberglass cloth which is coated with or covered with a suitable epoxy resin and a white gelcoat for finish purposes. A tapered fiberglass, wedge shaped member 24 is included to cause the floor to slope. The balsa layer is again covered on the bottom face by another layer of fiberglass 25. The bottom further includes an exposed external fiberglass layer 26. The bottom 18 slopes to the left. At the left side, a trough 27 is positioned for collection water or seepage which may otherwise fall to the floor. The trough 27 extends the full width of the inlet cabinet 20 as shown in FIG. 3 so that the sloping floor directs the water back to this location.

As further shown in FIG. 3, there is an upstanding encircling wall 28 which encircles three inlets 29 which are provided for entry at three locations at the lower end of the inlet cabinet 20. As will be understood, the inlets 29 can be at the very bottom at a location parallel with the bottom 18 as shown in FIG. 1, or they can be located at the top end or on the back vertical wall of the cabinet 20. The inlets 29 are moved dependent on the point of entry of the lines connecting into the equipment.

The upstanding wall 28 prevents water from running across the floor, perhaps overflowing the drain trough 27 and entering the ports 29. They are walled off by the upstanding wall 28. Water from the floor thus collects in the trough 27. The trough 27 opens to a downwardly directed drain hole (not shown) out of the structure, assuming that artesian waters do not rise to enter the structure. Otherwise, a sump pump is positioned with an inlet connecting into the trough 27 so that liquid from the floor collects in the trough and is removed.

FIG. 3 shows left and right transverse frame members 32 and 33. These extend across the top of the structure. The frame member 32 is better shown in FIG. 4 of the drawings. There, it extends across the top of the structure and connects with an upright frame member 34, and centered adjacent frame members 35 and 36. There is another frame member 37. The members 34-37 are arranged parallel to one another. FIG. 5 shows the upstanding frame member 34 which is near the front wall and adjacent to the door. A similar upstanding frame member 38 is also included. Thus, the two frame members in FIG. 5 provide structural support for equipment to be placed within the present housing. In similar fashion, FIGS. 5 and 6 jointly show similar upstanding frame members at the back of the housing at 37 and 39.

The vertical frame members are all supported on horizontal frame members 40 and 41 which extend along the bottom 18. If desired, the left and right frame members shown in FIGS. 5 and 6 can be joined by transverse frame members. Typically, the bottom 18 (see FIG. 2) supports horizontal equipment support runners 44 shown in FIG. 3. A pedestal 45 is likewise included for supporting equipment placed inside the cabinet or housing 10.

As described to this juncture, the housing shown in FIGS. 1, 2 and 3 is constructed around an internal framework which is preferably made of intersecting and parallel channel segments which are joined together for structural reinforcing. Moreover, these segments define a supportive frame work for cabinetry which will be placed in the housing. In addition to that, they are all supported on the bottom 18 which in turn rests in the hole which is dug for the equipment so that the load is distributed evenly across the bottom 18 in contact with the soil so that the weight of the equipment placed in the housing is fairly evenly distributed.

Observe that the door 14 opens so that entrance is through the cowling 13. As desired, the door can be positioned adjacent to a set of steps (not shown) which descend toward the bottom 18. An airflow pathway is incorporated so that air is drawn in through the louvered opening 16 at the door in FIG. 2, passing through the air filter 17 and exhausting through the exhaust fans 46 and 47 shown in FIG. 4 of the drawings. This air passage way is normally sufficient to exhaust stale air from the housing. If desired, heating equipment can be placed in the housing as for instance, electrically powered heating strips which provide heat in extremely cold environments. Alternately, the housing can also be provided with air conditioning equipment. In this event, the air conditioning equipment can be installed at the inlet cabinet 20 so that heat can be rejected through the air conditioning equipment which is supported in the fashion of a window air conditioning unit.

The present structure is provided with a wall construction which is detailed in FIGS. 7, 8 and 9. FIG. 7 shows a relatively simplified wall construction. There, the numeral 48 identifies the wall construction which is formed of a central sheet of balsa wood 49. There is a sheet of woven fiberglass cloth at 50, and a comparable sheet at 51. The sheets 50 and 51 are shown in FIG. 7 to have different thicknesses. The sheet 51 is normally the weather or exterior side while the sheet 50 is on the interior. Both sheets 50 and 51 are epoxy resin impregnated. FIG. 8 shows a different sandwich construction. It shows a built up multi-ply layer adhesively joined together which is intended for the bottom 18. It is intended for foot traffic and is constructed to resist that. Accordingly, the exposed inner layer which experiences the foot traffic is a white gelcoat interior layer 55. It adheres to a layer of woven fiberglass which is sometimes known as roving, that being indicated at 56. That is adhesively joined to a layer of particulate material 57 which is made strong by means of epoxy resin which penetrates the particles that make up this layer. The center layer 58 is a thicker layer of a different type of particle board. The layer 59 is similar to the layer 57. The layer 60 is made of the same material as the layer 56, that is, it is a layer of woven fiberglass material. The next layer 61 is similar to the layers 57 and 59. The exterior surface is a green gelcoat exterior finish 62. Collectively, these layers form sheet material which is approximately 0.375 inches or thicker. It is a sandwich of sufficient strength that it is able to support foot wear and the point loading which may arise from that. By contrast, the sidewall construction shown in FIG. 7 is used for the vertical walls and top of the housing 10.

FIG. 10 shows a mechanism for anchoring the present apparatus. More particularly, FIG. 10 sets out an eye-bolt 64 which is anchored in the wall, typically being supported by an anchor plate 65 on the opposite side of the wall. The plate 65 is a large width anchor plate to distribute stress coupled to it by the eye-bolt. The bolt threads into hole in the plate and is otherwise joined to it permanently so that point loading does not tear a hole in the wall. A cable 66 with end eyelets connects from the eyelet 64 and then connects with a ground anchor 67. The anchor is driven into the soil and tends to retain its position, so to speak, being threaded into the supportive earth. The cable 66 is made tight. For instance, the cable 66 can be furnished with a turnbuckle for tightening to anchor down the present apparatus. Typically, the anchor mechanism shown in FIG. 10 is placed at several locations around the cabinet 10.

Attention is now directed to the inlet cabinet 20 shown in the drawings. In particular, the detailing found in FIG. 6 is important. There, upright or vertical stringers 70 are shown supported for connection with the cables which connect into the inlet cabinet. Assume that the present apparatus is filled with telephone equipment and to this end, that it connects with several thousand pair of telephone conductors. Typically, underground or overhead conduit cables enclosing hundreds, perhaps thousands, of conductors pairs are brought in either at the top or the bottom as mentioned earlier. These multi-pair cables are connected with connective terminals which are mounted on the upstanding racks at 70. Indeed, the rack 70 can extend the full width of the cabinet 20 shown in FIG. 6. This permits terminal strips to be affixed at many locations so that all the conductor pair terminals are exposed. From there, connections are made with additional equipment inside the housing 10.

The housing 10 is constructed by layered construction with the top and sidewalls constructed in the fashion of FIG. 7. This is achieved by a built-up process wherein the sheet balsa wood is shaped to the illustrated shape, fiberglass cloth or roving is placed thereon, and the fiberglass is then sprayed with an epoxy resin which is permitted to cure. This constructs a waterproof shell with external and internal skins which are impervious to water. High quality thermal insulation is obtained by the construction shown in FIG. 7 so that the heat fluctuations from changes in climate are held to a minimum. The equipment placed on the interior may include strip heaters (not shown) which will heat the interior should the equipment be placed in a northern climate exposed to severe winter temperatures. In like fashion, air conditioning equipment can be used to remove heat from the structure. Assuming air ventilation through the structure, the preferable air flow path is through the louvered door 16, through the filter 17 shown in FIG. 3, and out through the vent fans 46 and 47 shown in FIG. 4.

One of the advantages of the present apparatus is that the device can be made as a hollow shell with the framework shown in the interior yet with the interior empty so that hundreds of conductor pairs can be inserted to the interior, connected to terminals on the vertical rack 70 (see FIG. 6) and the racks of equipment are thereafter installed so that the equipment operates in the intended fashion. To this end, the equipment must be sized so that it will pass through the door 14. The door 14 typically has a height of about five feet and a width of about three feet so that the size of the opening is sufficient to permit multiple units of cabinet mounted equipment to be inserted into the chamber. This is done time and again so that the interior of the cabinet is filled with the necessary equipment. The equipment is preferably modular so that it can be installed either at the factory or in the field, and the modular equipment further permits field servicing. The equipment is normally placed on the interior supported on the horizontal members 44 shown in FIG. 3, or otherwise mounted on the pedestal 45. If desired, the equipment can rest on horizontal members 40 and 41 across the bottom 18 (see FIG. 5). The equipment, once placed on the interior, leaves little room for personnel maneuvering. However, it is possible in limited circumstances for service personnel to enter the door 14 and to step down to the floor or bottom 18 where they are supported on the bottom for the purposes of carrying out service work. Since the interior is substantially limited in space, it is normally desirable to install modular equipment which is rack mounted and removable from the interior for external service.

The door 14 is preferably closed by a lock which keeps the housing safe from vandals and unwanted intruders. Moreover, the door can be installed adjacent to a pressure switch so that the door, when opened, forms a signal which turns on an interior light by providing electrical power to it, and which also forms a signal which is transmitted to a remote location. Further, equipment on the interior preferably includes electrical power outlets to operate the internal lights, trouble shooting lights, service equipment and the like which are brought by the service personnel. To this end, electrical service is provided through the service connection 75 shown in FIG. 3. This can be the typical 110 VAC which is furnished for commercial operations. Ordinarily, the present apparatus does not enclose electric motors of sufficient size to require 220 VAC or even higher voltages.

For purposes of handling, overhead hoisting hooks can be anchored in the fashion of the eye bolt tie down 64 shown in FIG. 1 except that they are preferably located across the top of the structure, typically being four in number, wherein they are anchored into the transverse top frame members across the top. In the preferred embodiment, four are included so that they extend above the top cover for easy engagement by overhead hoisting equipment.

The foregoing describes a fabricated box which is relatively light weight when empty. The weight primarily stems from the equipment which is placed therein. Accordingly, the present apparatus is manufactured by assembling the frame work of the metal frame members, and then positioning the built-up walls therearound. The walls are built up in the fashion of FIG. 7 of the drawings for the sides and top. Similar construction is used in the bottom 18 except that there are additional layers of material, see FIGS. 8 and 9. FIG. 9 shows how the floor slopes ever so slightly to assure drainage to the back edge. The drainage flows across the floor around the runners 44 so that it is collected in the trough 27. Ideally, the equipment is held up high so that the water which coincidentally enters does not interfere with operation of the system.

While the foregoing is directed to the preferred embodiment, the scope thereof is determined by the claims which follow.

What is claimed is:

1. A housing for unmanned equipment installed therein and wherein the housing is exposed to inclement weather comprising:
    (a) an encircling, generally rectangular housing formed of a top and sidewalls, said top and sidewalls defining an interior space for storing equipment therein;
    (b) a bottom on said housing providing a surface area for resting on the bottom of a hole to support said housing in an upright and stabilized position to prevent tipping, and wherein said housing is adapted to be partially enclosed by the hole;
    (c) an inlet cabinet on said housing, said cabinet comprising:
        (1) a cabinet top and bottom defining
        (2) a space in said cabinet for conductor deployment in the space, and
        (3) cabinet supported inlet means enabling multiple conductor connection from the exterior to the interior of said cabinet wherein
        (4) said inlet means have the form of openings from the exterior into said cabinet to thereby permit external conductor deployment therethrough; and
    (d) wherein one of said sidewalls supports an extended cowling surrounding the periphery of a door, and said door is positioned on said one sidewall above said bottom to enable said one sidewall to be partially buried.

2. The apparatus of claim 1 wherein said door includes a door lock and is mounted for opening sufficiently large to enable personnel entry thereinto.

3. The apparatus of claim 2 including a sloping bottom supported floor directed to a water collection trough.

4. The apparatus of claim 3 wherein said housing encloses an internal framework for said housing having horizontal and vertical members.

5. The apparatus of claim 4 wherein said horizontal members include top abutting members.

6. The apparatus of claim 5 wherein said vertical members include bottom abutting members.

7. The apparatus of claim 1 wherein said housing is a sandwich formed of a central sheet of core material, and said sandwich further includes face located fiberglass layers bonded with epoxy resin.

8. The apparatus of claim 7 wherein said bottom is a sandwich formed of bottom located parallel sheets of core materials having a planar form, and said bottom has an exposed external face and an internal face, and both of said faces include gel coat.

9. The apparatus of claim 8 wherein said faces are woven fiberglass.

10. The apparatus of claim 9 wherein said bottom includes a wedge shaped member sloping said bottom internal face.

11. The apparatus of claim 10 wherein said bottom slopes to an edge thereof, and said edge abuts an elongate drainage trough.

12. The apparatus of claim 11 including an upstanding wall adjacent to said trough to limit water flow so that water collects in said trough.

13. The apparatus of claim 12 including equipment support runners across said bottom.

14. The apparatus of claim 13 wherein said cabinet extends partially but not fully to said bottom.

15. The apparatus of claim 14 wherein said cabinet supports vertical support members.

16. The apparatus of claim 1 wherein said walls and top are formed of a sheet sandwich of waterproof materials, and said bottom is formed of a heavier sheet sandwich of waterproof materials than said walls and top.

17. The apparatus of claim 16 wherein said bottom includes means supporting equipment placed in said housing.

18. The apparatus of claim 16 wherein said walls support spaced eye-bolt tie points to anchor said housing.

19. A housing for unmanned equipment installed therein and wherein the housing is exposed to inclement weather comprising:
    (a) an encircling, generally rectangular housing formed of a top and sidewalls, said top and sidewalls defining an interior space for storing equipment therein;
    (b) a bottom on said housing providing a surface area for resting on the bottom of a hole to support said housing in an upright and stabilized position to prevent tipping, and wherein said housing is adapted to be partially enclosed by the hole;
    (c) an inlet cabinet on said housing, said cabinet comprising:
        (1) a cabinet top and bottom defining
        (2) a space in said cabinet for conductor deployment in the space, and
        (3) cabinet supported inlet means enabling multiple conductor connection from the exterior to the interior of said cabinet wherein
        (4) said inlet means have the form of openings into said cabinet to thereby permit conductor deployment therethrough;
    (d) wherein said housing is a sandwich formed of a central sheet of core material, and said sandwich further includes face located fiberglass layers bonded with resin;
    (e) wherein said bottom is a sandwich formed of bottom located parallel sheets of core materials having a planar form, and said bottom has an exposed external face and an internal face, and both of said faces include gel coat and woven fiberglass;
    (f) wherein said bottom includes a wedge shaped member sloping said bottom internal face and said bottom slopes to an edge thereof, and said edge abuts an elongate drainage through;
    (g) an upstanding wall adjacent to said trough to limit water flow so that water collects in said trough; and
    (h) equipment support runners across said bottom.

20. The apparatus of claim 19 wherein one of said walls supports an extended cowling surrounding the periphery of a door, and said door is positioned on said wall above said bottom to enable said wall to be partially buried.

21. The apparatus of claim 20 wherein said door includes a door lock and is mounted for opening sufficiently large to enable personnel entry thereinto.

22. The apparatus of claim 21 including a sloping bottom supported floor directed to a water collection trough.

23. The apparatus of claim 22 wherein said housing encloses an internal framework for said housing having horizontal and vertical members.

24. The apparatus of claim 23 wherein said horizontal members include top abutting members.

25. The apparatus of claim 24 wherein said vertical members include bottom abutting members.

26. A housing for unmanned equipment installed therein and wherein the housing is exposed to inclement weather comprising:
  (a) an encircling, generally rectangular housing formed of a top and sidewalls, said top and sidewalls defining an interior space for storing equipment therein;
  (b) a bottom on said housing providing a surface area for resting on the bottom of a hole to support said housing in an upright and stabilized position to prevent tipping, and wherein said housing is adapted to be partially enclosed by the hole;
  (c) an inlet cabinet on said housing, said cabinet comprising:
    (1) a cabinet top and bottom defining
    (2) a space in said cabinet for conductor deployment in the space, and
    (3) cabinet supported inlet means enabling multiple conductor connection from the exterior to the interior of said cabinet wherein
    (4) said inlet means have the form of openings into said cabinet to thereby permit conductor deployment therethrough; and
  (d) wherein said sidewalls and top are formed of a sheet sandwich of waterproof materials, and said bottom is formed of a heavier sheet sandwich of waterproof than said walls and top materials.

27. The apparatus of claim 26 wherein said bottom includes means supporting equipment placed in said housing.

28. The apparatus of claim 26 wherein said walls support spaced eye-bolt tie points to anchor said housing.

29. A housing for unmanned equipment installed therein and wherein the housing is exposed to inclement weather comprising:
  (a) an encircling, generally rectangular housing formed of a top and sidewalls, said top and sidewalls defining an interior space for storing equipment therein;
  (b) a bottom on said housing providing a surface area for resting on the bottom of a hole to support said housing in an upright and stabilized position to prevent tipping, and wherein said housing is adapted to be partially enclosed by the hole;
  (c) wherein one of said sidewalls supports an extended cowling surrounding the periphery of a door, and said door is positioned on said one sidewall above said bottom to enable said one sidewall to be partially buried;
  (d) upstanding frame members and cooperative bottom supports, equipment mounting runners within said housing; and
  (e) means externally of said housing for anchoring said housing partially buried in a hole having a bottom conformed shape.

30. The apparatus of claim 29 including multiple externally located, cable connected eye-bolts comprising said anchoring means.

31. The apparatus of claim 30 including means for circulating air in said housing.

* * * * *